(12) United States Patent
Kumar

(10) Patent No.: US 8,880,228 B2
(45) Date of Patent: Nov. 4, 2014

(54) SYSTEM AND METHOD FOR MITIGATING AN ELECTRIC UNBALANCE OF A THREE-PHASE CURRENT AT A POINT OF COMMON COUPLING BETWEEN A WIND FARM AND A POWER GRID

(75) Inventor: Sathees Kumar, Herning (DK)

(73) Assignee: Siemens Aktiengesellschaft, Munich (DE)

( * ) Notice: Subject to any disclaimer, the term of this patent is extended or adjusted under 35 U.S.C. 154(b) by 424 days.

(21) Appl. No.: 13/360,874

(22) Filed: Jan. 30, 2012

(65) Prior Publication Data

US 2012/0203385 A1   Aug. 9, 2012

(30) Foreign Application Priority Data

Feb. 7, 2011   (EP) .................................... 11153557

(51) Int. Cl.
| | | |
|---|---|---|
| G05D 3/12 | (2006.01) | |
| G05D 5/00 | (2006.01) | |
| G05D 9/00 | (2006.01) | |
| G05D 11/00 | (2006.01) | |
| G05D 17/00 | (2006.01) | |
| F03D 9/00 | (2006.01) | |
| H02P 9/04 | (2006.01) | |
| H02J 3/38 | (2006.01) | |
| H02J 3/26 | (2006.01) | |

(52) U.S. Cl.
CPC ................. *H02J 3/26* (2013.01); *Y02E 10/763* (2013.01); *H02J 3/386* (2013.01); *Y02E 40/50* (2013.01)
USPC ............. 700/286; 700/287; 700/290; 290/44; 290/55

(58) Field of Classification Search
CPC ........................ Y02E 10/723; H02P 2009/004
USPC ....................... 290/44, 55; 700/286–287, 290
See application file for complete search history.

(56) References Cited

U.S. PATENT DOCUMENTS

| 6,924,565 | B2 * | 8/2005 | Wilkins et al. .................. 290/44 |
|---|---|---|---|
| 7,071,579 | B2 * | 7/2006 | Erdman et al. .................. 290/55 |
| 7,119,452 | B2 * | 10/2006 | Larsen ............................ 290/55 |
| 7,839,024 | B2 * | 11/2010 | Cardinal et al. ................ 307/84 |
| 8,041,465 | B2 * | 10/2011 | Larsen et al. ................. 700/287 |
| 8,046,109 | B2 * | 10/2011 | Larsen et al. ................. 700/293 |

(Continued)

OTHER PUBLICATIONS

Tzung-Lin Lee, Shang-Hung Hu, Yu-Hung Chan: "Design of D-Statcom for Voltage Regulation in Microgrids", 2010 IEEE, Sep. 12, 2010, pp. 1-6, XP031834322; Others; 2010.

(Continued)

*Primary Examiner* — Ronald Hartman, Jr.

(57) ABSTRACT

A system is provided for mitigating an electric unbalance of a three-phase current at a Point of Common Coupling being located between a wind farm having a plurality of wind turbines and a power grid. The system includes a measurement device and a central wind farm controller. The measurement device measures the electric unbalance at the Point of Common Coupling and provides a measurement signal being indicative for the measured electric unbalance. The central wind farm controller is coupled to the measurement device and controls the operation of the plurality of wind turbines. In response to the measurement signal the central wind farm provides a control signal for mitigating the electric unbalance at the Point of Common Coupling. Also provided is a corresponding method for mitigating an electric unbalance of a three-phase current and a computer program for controlling and/or for carrying out the mentioned method.

10 Claims, 2 Drawing Sheets

(56) References Cited

U.S. PATENT DOCUMENTS

| | | | |
|---|---|---|---|
| 8,509,958 B2* | 8/2013 | Larsen et al. | 700/294 |
| 8,698,334 B2* | 4/2014 | Bo et al. | 290/44 |
| 2010/0264666 A1* | 10/2010 | Bo et al. | 290/55 |
| 2010/0332040 A1* | 12/2010 | Garcia | 700/287 |
| 2013/0264824 A1* | 10/2013 | Gupta et al. | 290/44 |
| 2013/0300118 A1* | 11/2013 | Bech | 290/44 |
| 2014/0159367 A1* | 6/2014 | Yin | 290/44 |

OTHER PUBLICATIONS

Guizhen Tian, Shengtie Wang and Guangchen Liu: "Power Quality and Transient Stability Improvement of Wind Farm with Fixed-Speed Induction Generators Using a Statcom", POWERCON, Oct. 24, 2010, pp. 1-6, XP031834322; Others; 2010.

Yi Wang, Lie Xu: "Coordinated Control of DFIG and FSIG-Based Wind Farms Under Unbalanced Grid Conditions", IEEE Transactions on Power Delivery, vol. 25, No. 1, Jan. 1, 2010, pp. 367-377, XP011285675; Others; 2010.

Clark Hochgraf, Robert H. Lasseter: "Statcom Controls for Operation with Unbalanced Voltages", IEEE Transactions on Power Delivery, vol. 13, No. 2, Apr. 1, 1998, pp. 538-544, XP011049493; Others; 1998.

* cited by examiner

SYSTEM AND METHOD FOR MITIGATING AN ELECTRIC UNBALANCE OF A THREE-PHASE CURRENT AT A POINT OF COMMON COUPLING BETWEEN A WIND FARM AND A POWER GRID

CROSS REFERENCE TO RELATED APPLICATIONS

This application claims priority of European Patent Office application No. 11153557.1 EP filed Feb. 7, 2011. All of the applications are incorporated by reference herein in their entirety.

FIELD OF INVENTION

The present invention relates to the technical field of transmitting electrical power, which has been generated by a wind farm comprising a plurality of wind turbines, from the wind farm to a power grid. In particular, the present invention relates to a system and to a method for mitigating an electric unbalance of a three-phase current at a Point of Common Coupling being located between a wind farm comprising a plurality of wind turbines and a power grid. Further, the present invention relates to a computer program, which is configured for controlling the above described electric unbalance mitigating method.

ART BACKGROUND

Wind turbines are used to convert wind energy to electrical energy in a clean and efficient way. In a wind turbine a rotor comprising rotor blades drives an electric generator, either directly or by means of a gearbox. The alternating current (AC) frequency that is developed at the stator terminals of the generator is directly proportional to the speed of rotation of the rotor. The voltage at the stator terminals also varies as a function of the rotational speed of the generator. For an optimum energy capture, this rotational speed varies according to the speed of the wind driving the rotor blades. To limit the energy capture at high wind speeds and to avoid a damage of the rotor, the rotational speed of the generator is controlled by altering the pitch angle of the rotor blades.

An adaptation of the variable voltage and frequency of the electric generator to a nominally fixed voltage and frequency of a power grid is typically achieved by a power converter. A power converter typically includes a generator bridge, which in normal operation operates as an active rectifier to supply power to a direct current (DC) link. The generator bridge can have any suitable topology with a series of semiconductor power switching devices fully controlled and regulated using a pulse width modulation (PWM) strategy. A power converter typically comprises two network bridges, wherein a first network bridge converts the AC power signal provided by the generator to a DC power signal and a second network bridge converts this DC power signal to an AC power signal, which in voltage, frequency and phase angle is matched to the power grid.

WO 2010/018424 A1 discloses a method of controlling a power converter to deliver an amount of active power and an amount of reactive power to a three-phase power grid. The method comprises providing a wind-powered multi-phase generator and an AC-AC converter operating in a PWM mode. The AC-AC converter has a set of converter input terminals connected to the three-phase generator and a set of converter output terminals connected via a converter impedance to a set of grid input terminals of the three-phase grid. The method further includes providing a control unit comprising a measurement unit for measuring current and voltage and a microcontroller running a control algorithm for generating a current reference value. The measurement unit measures the current and/or the voltage on the converter output terminals and/or on the power grid input terminals. The AC-AC converter regulates the current on the grid input terminals such that it corresponds to the current reference value.

EP 1 995 863 A2 discloses a method of controlling a plurality of power converters that can be used to interface to a supply network or a power grid. Each power converter includes a network bridge operating in accordance with a PWM strategy, which has the same switching period and which causes at least one unwanted harmonic in the voltage of the power grid. The method includes the step of providing the switching period of the PWM strategy of each network bridge with a different time offset relative to a time datum such that the at least one unwanted harmonic in the supply network voltage is at least partially cancelled.

A wind farm or wind park, also known as wind power plant, is a collection of a few tens or a few hundreds of wind turbines installed in close vicinity with respect to each other. Within a wind farm the electric power generated by the various wind turbines is aggregated at a common collector bus (bus bar), which hereinafter is also denominated a Point of Common Coupling (PCC).

Wind farms are usually located in rural places several miles away from a power grid. Therefore, an electric power transmission link must be used in order to connect the PCC with a substation of a power grid. This often results in a "weak" grid at the PCC. At the PCC disturbances in the power grid e.g. caused by asymmetric loads of the power grid will be seen as an unbalance where, in an electric vector diagram showing the phase angles and the magnitudes of each phase, the phase offset and the magnitudes aren't equal during the disturbance. For a balanced system the magnitude of the voltage vectors are equal to each other and the phase offsets between the different phases are 120°. For an unbalanced system the magnitudes aren't equal nor are the phase offsets.

In power engineering it is a common practice to treat an unbalanced system by a superposition of symmetrical components. This means that the unbalanced system is composed into a positive sequence, a negative sequence and a zero sequence. The positive sequence represents a vector diagram of a balanced system, wherein the vectors rotate in counter-clockwise direction. The negative sequence represents a vector diagram of a balanced system, wherein the vectors rotate also in counterclockwise direction. The zero sequence represents just a single vector rotating also in the counterclockwise direction.

For a balanced system there exists only a positive sequence. The negative sequence will show up only in case of some unbalance. An existence of the zero sequence is an indication for a fault in the electric network.

For a typical wind farm application the positive sequence vectors may have an amplitude of e.g. 132 kV. The negative sequence vectors typically have an amplitude of e.g. 150 V to 200 V. Of course, the ideal case would be if the negative sequence vectors have an amplitude of 0 V, but that is very unlikely in reality.

There may be a need for balancing an electric system comprising a wind farm and a power grid in order to get a better voltage quality.

SUMMARY OF THE INVENTION

This need may be met by the subject matter according to the independent claims. Advantageous embodiments of the present invention are described by the dependent claims.

According to a first aspect of the invention there is provided a system for mitigating an electric unbalance of a three-phase current at a Point of Common Coupling being located between a wind farm comprising a plurality of wind turbines and a power grid. The provided system comprises (a) a measurement device for measuring the electric unbalance at the Point of Common Coupling and for providing a measurement signal being indicative for the measured electric unbalance, and (b) a central wind farm controller for controlling the operation of the plurality of wind turbines, wherein the central wind farm controller is coupled to the measurement device and wherein in response to the measurement signal the central wind farm controller is configured for providing a control signal for mitigating the electric unbalance at the Point of Common Coupling.

The described electric unbalance mitigating system is based on the idea that the central wind farm controller which is used for coordinating the operation of the plurality of wind turbines of the wind farm can also be used for controlling the electric balance respectively for mitigating the electric unbalance at the Point of Common Coupling (PCC).

By contrast to known techniques for mitigating an electric unbalance in connection with wind turbines the unbalance measurement is not performed at the at terminal being assigned to one or more wind turbines. According to the invention the unbalance measurement is directly taken at the PCC.

In this document the term PCC may particularly denote an electric node of the wind farm, at which the electric power generated by the various wind turbines of the wind farm is aggregated. The PCC might be realized with a common collector bus (bus bar), which is connected with each of the plurality of wind turbines.

According to an embodiment of the invention the measurement signal is a Voltage Unbalance Factor which is given by the ratio between the amplitude of a negative sequence and the amplitude of a positive sequence of the voltage signal of the three-phase current at the Point of Common Coupling.

As has already been mentioned above in this respect the positive sequence and the negative sequence are symmetrical (balanced) components of the unbalanced voltage signal at the Point of Common Coupling. Specifically, the positive sequence represents a vector diagram of a balanced system, wherein the vectors rotate in counterclockwise direction, and the negative sequence represents a vector diagram of a balanced system, wherein the vectors also rotate in counterclockwise direction.

Descriptive speaking, the Voltage Unbalance Factor (VUF) at the PCC is determined by the measurement device and the VUF is forwarded to the central wind farm controller. Based on the VUF the central wind farm controller causes at least some of the wind turbines and/or an electric unbalancing compensation unit to be operated in such a manner that the electric unbalance at the PCC is reduced at least approximately.

The following equation (1) shows a mathematical definition of the VUF:

$$VUF = \frac{|V^-|}{|V^+|} \quad (1)$$

Thereby, $|V^-|$ is (the absolute value of) the negative sequence voltage amplitude and $|V^+|$ is (the absolute value of) the positive sequence voltage amplitude.

In this respect it is mentioned that a perfectly balanced electrical system would have no negative sequence ($|V^-|=0$) and hence VUF=0. For wind turbine applications typical values for VUF are in the range of 1% to 2%.

It is mentioned that in the described embodiment a negative sequence controller is incorporated in the central wind farm controller. This has the advantage that apart from the described measurement device no further experimental effort is necessary in order to accomplish the unbalance mitigation. Therefore, the central wind farm controller, which is essential anyway in order to operate the plurality of wind turbines in a coordinated manner, can be used for effectively reducing an electric unbalancing at the PCC. As a consequence, (a) the voltage quality at the PCC can be improved, (b) harmonic disturbances at the PCC, which are caused by an electric unbalance, can be reduced and/or (c) an additional power loss, which is caused by such harmonics, can be minimized.

According to a further embodiment of the invention the central wind farm controller is configured for determining a difference value between the measured Voltage Unbalance Factor and a predefined reference Voltage Unbalance Factor. Further, the central wind farm controller comprises a control unit, which is configured for processing the determined difference value and for outputting a negative sequence voltage compensation signal which is used for mitigating the electric unbalance at the Point of Common Coupling.

Descriptive speaking, the control unit of the central wind controller is configured to react on the measured VUF. The predefined reference Voltage Unbalance Factor, which represents a reference value for VUF, is set in the central wind farm controller. The measured VUF is compared to this reference value (i.e. set to 0.02 or 0.03) and fed through the control unit with provides at its output the negative sequence voltage compensation signal.

In order to accomplish the desired mitigation of the electric unbalance at the Point of Common Coupling this signal can be injected or added to a so called phasor voltage, which is forwarded to the power converters of at least some of the plurality of wind turbines. In this respect the phasor voltage is a signal which is used by the respective power converter for changing phase offsets between each phase of the three-phase current of the respective power converter. Naturally, such a phase offset change will have an effect on the electric (un)balance at the Point of Common Coupling.

Alternatively or in combination, the negative sequence voltage compensation signal can also be forwarded to an electric unbalancing compensation unit. In response to the negative sequence voltage compensation signal the electric unbalancing compensation unit can inject adjustment currents to the various phases of the three-phase current at the PCC such that the electric unbalance at the PCC is reduced at least approximately.

According to a further embodiment of the invention the control unit comprises (a) a proportional (P) control circuit, (b) a proportional derivative (PD) control circuit, (c) a proportional integral derivative (PID) control circuit and/or (d) a Lead/Lag control circuit. This may provide the advantage that the control unit can be realized by known and well established control circuits for reacting on a difference between the measured VUF and the predefined reference VUF.

In this respect it is mentioned that the Lead/Lag control circuit relies in a known manner on a transfer function being rearranged so that the output of the Lead/Lag control circuit is expressed in terms of sums of terms involving the input, and integrals of the input and the output.

According to a further embodiment of the invention the control signal being provided by the central wind farm controller is a compensation signal for power converters of at least some of the plurality of wind turbines. This may mean that the control signal is a so called phasor voltage signal, which is provided by the central control unit to the respective wind turbine power converters (a) for changing the phase value of at least one phase of the respective three-phase current at the output of the respective wind turbine power converter and/or (b) for changing the offsets between the individual phases of the three-phase current at the output of the respective wind turbine power converter. Naturally, such a phase value changes and/or phase offset changes will have an impact on the electric (un)balance at the PCC.

According to a further embodiment of the invention the system further comprises an electric unbalancing compensation unit, which is coupled to the central wind farm controller and which, in response to the control signal provided by the central wind farm controller, is configured for injecting adjustment currents to the various phases of the three-phase current at the Point of Common Connection.

The described electric unbalancing compensation unit can be installed in close proximity to the PCC. This electric unbalancing compensation unit receives the control signal from the central wind farm controller and adjusts the injected negative sequence current in such a way that the electric unbalance at the PCC is mitigated.

According to a further embodiment of the invention the system further comprises a transformer, which is connected between the Point of Common Coupling and a power transmission link connecting the transformer with a substation of a power grid. This may provide the advantage that the voltage at the PCC can be changed or adapted in such a manner that an effective power transmission via the power transmission link can be accomplished. Preferably, the transformer is a voltage step-up transformer, which receives a certain voltage level from the PCC and provides an increased voltage level to the power transmission link. This may provide the advantage that the power loss within the power transmission link can be reduced.

According to a further embodiment of the invention the measurement device is connected between the Point of Common Coupling and the transformer. This may provide the advantage that the unadulterated voltage signals and its degree of unbalance can be precisely measured directly from the PCC, which in particular in case of a long power transmission link cable represents the crucial "weak point" of the power connection between the wind farm and the substation of the power grid.

According to a further embodiment of the invention the measurement device is connected between the transformer and the power transmission link. In case of a step-up transformer this means that the measurement device is located on the higher voltage side of the transformer.

According to a further aspect of the invention there is provided a method for mitigating an electric unbalance of a three-phase current at a Point of Common Coupling being located between a wind farm comprising a plurality of wind turbines and a power grid. The provided method comprises (a) measuring the electric unbalance at the Point of Common Coupling by means of a measurement device, (b) forwarding a measurement signal being indicative for the measured electric unbalance from the measurement device to a central wind farm controller, which is adapted for controlling the operation of the plurality of wind turbines, and (c) providing by the central wind farm controller in response to the measurement signal a control signal for mitigating the electric unbalance at the Point of Common Coupling.

Also the described electric unbalance mitigating system is based on the idea that the central wind farm controller which is used for coordinating the operation of the plurality of wind turbines of the wind farm can also be used for controlling the electric balance at the PCC.

According to a further aspect of the invention there is provided a computer program for mitigating an electric unbalance of a three-phase current at a Point of Common Coupling being located between a wind farm comprising a plurality of wind turbines and a power grid. The computer program, when being executed by a data processor, is adapted for controlling and/or for carrying out the above described method for mitigating an electric unbalance of a three-phase current at a Point of Common Coupling being located between a wind farm comprising a plurality of wind turbines and a power grid.

As used herein, reference to a computer program is intended to be equivalent to a reference to a program element and/or to a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
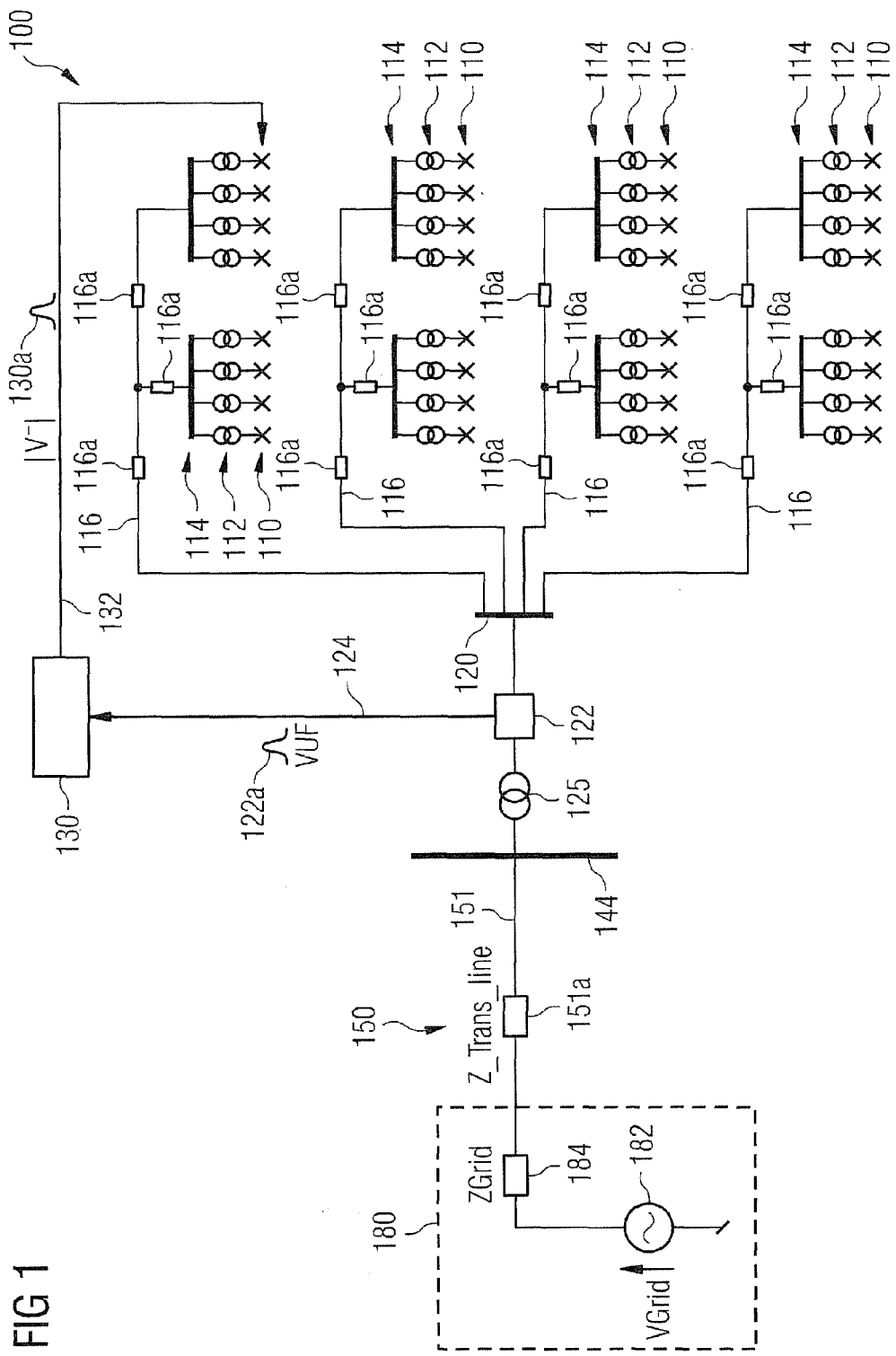
FIG. 1 shows a wind farm comprising a PCC for connecting the wind turbines of the wind farm with a power grid, wherein in accordance with a first embodiment of the invention a central wind farm controller (a) receives from a measurement device being connected to the PCC a VUF and (b) controls in response to the received VUF the operation of power converters of the wind turbines in such a manner that an electric unbalance at the PCC is mitigated.

The illustration in the drawing is schematically. It is noted that in different figures, similar or identical elements are provided with reference signs, which are different from the corresponding reference signs only within the first digit.

FIG. 1 shows a wind farm 100, which comprises a plurality of wind turbines 110. Each wind turbine 110, which is illustrated as an "X", comprises a not depicted individual control unit and a not depicted electric converter. The electric converter converts in a known manner an asynchronous AC power output, which is provided by a wind driven electric generator of the wind turbine 110, firstly into a DC power and secondly into a synchronous AC power output with a given AC frequency. The wind farm 100 further comprises a plurality of transformers 112, wherein respectively one transformer 112 is assigned to one wind turbine 100 and connects the respective wind turbine 110 to a bus bar 114. According to the embodiment described here the electric power being generated by respectively four wind turbines 110 is collected at one bus bar 114.

As can be seen from FIG. 1, the bus bars 114 are connected via high voltage cables 116 to a central bus bar 120, which represents the Point of Common Connection (PCC) of the wind farm. The impedance of the high voltage cables 118 are schematically illustrated as impedances 116a.

The wind farm 100 further comprises a central wind farm controller 130, which is connected via a data connection network (only one data connection line 132 is shown in FIG. 1) with each one of the individual control units of the wind turbines 110. According to the embodiment described here the central wind farm controller 130 acts as a superordinate controller for all wind turbines 120 of the wind farm 100. By supervising the individual control units the central wind farm controller 130 is capable of controlling the operation of the wind turbines 110 in a coordinated manner. In this context, the central wind farm controller 130 collects operational information regarding the individual wind turbines 110 and transmits appropriate control signals to the respective individual control units.

It is mentioned that in the context of the embodiment of the invention described here controlling the operation of the wind turbines 110 also includes a control of the operation of the electric converters of the wind turbines 110. As will be described below in more detail, by controlling the operation of the wind turbine converters the electric balancing at the PCC 120 can be affected.

As can be further seen from FIG. 1, the PCC 120 is connected with a substation 180 via a central transformer 125, a bus bar 144 and an AC power transmission link 150. According to the embodiment described here the central transformer 125 increases the voltage from 33 kV (at the PCC 120) to 275 kV at the bus bar 144. By increasing the voltage the loss of electric power during its transmission to the substation 180 can be reduced. Of course, also other voltage steps are possible. Further, the described embodiment the AC power transmission link 150 comprises a subsea cable 151, which has an impedance (Z_Trans_line) 151a. In FIG. 1, the substation 180 is schematically illustrated by its Thevenin equivalent voltage source 182 and its Thevenin equivalent impedance 184.

A measurement unit 122 is connected between the PCC and the central transformer 125. The measurement unit 122 measures the electric unbalance at the PCC 120 and provides a measurement signal 122a being indicative for the measured electric unbalance at the PCC 120. This measurement signal 122a is forwarded via a data connection 124 to the central wind farm controller 130. According to the embodiment described here the measurement signal is a Voltage Unbalance Factor (VUF) 122a which is given by the ratio between the amplitude of a negative sequence and the amplitude of a positive sequence of the voltage signal of the three-phase current at the PCC 120.

Based on the VUF 122a the central wind farm controller 130 determines a control signal 130a, which is forwarded by the data connection line 132 to the various individual control units of the wind turbines 110. According to the embodiment described here the control signal 130a is the amplitude of the negative sequence of the unbalanced three-phase voltage signal at the PCC 120. In FIG. 1 this amplitude is denominated with |V−|.

Based on the amplitude |V−| of the negative sequence the individual control units of the wind turbines 110 are operated in such a manner, that an electric unbalance at the PCC 120 is reduced at least approximately. Specifically, the individual control units may be operated such that the phase angles of the individual three-phase currents provided by the individual wind turbines 110 are adjusted such that after combining the individual power outputs of the various wind turbines 110 at the PCC 120 an unbalance at the PCC 120 is mitigated.

It is mentioned that it would be also possible to place the measurement unit between the transformer 125 and the bus bar 144.

Figure 2:
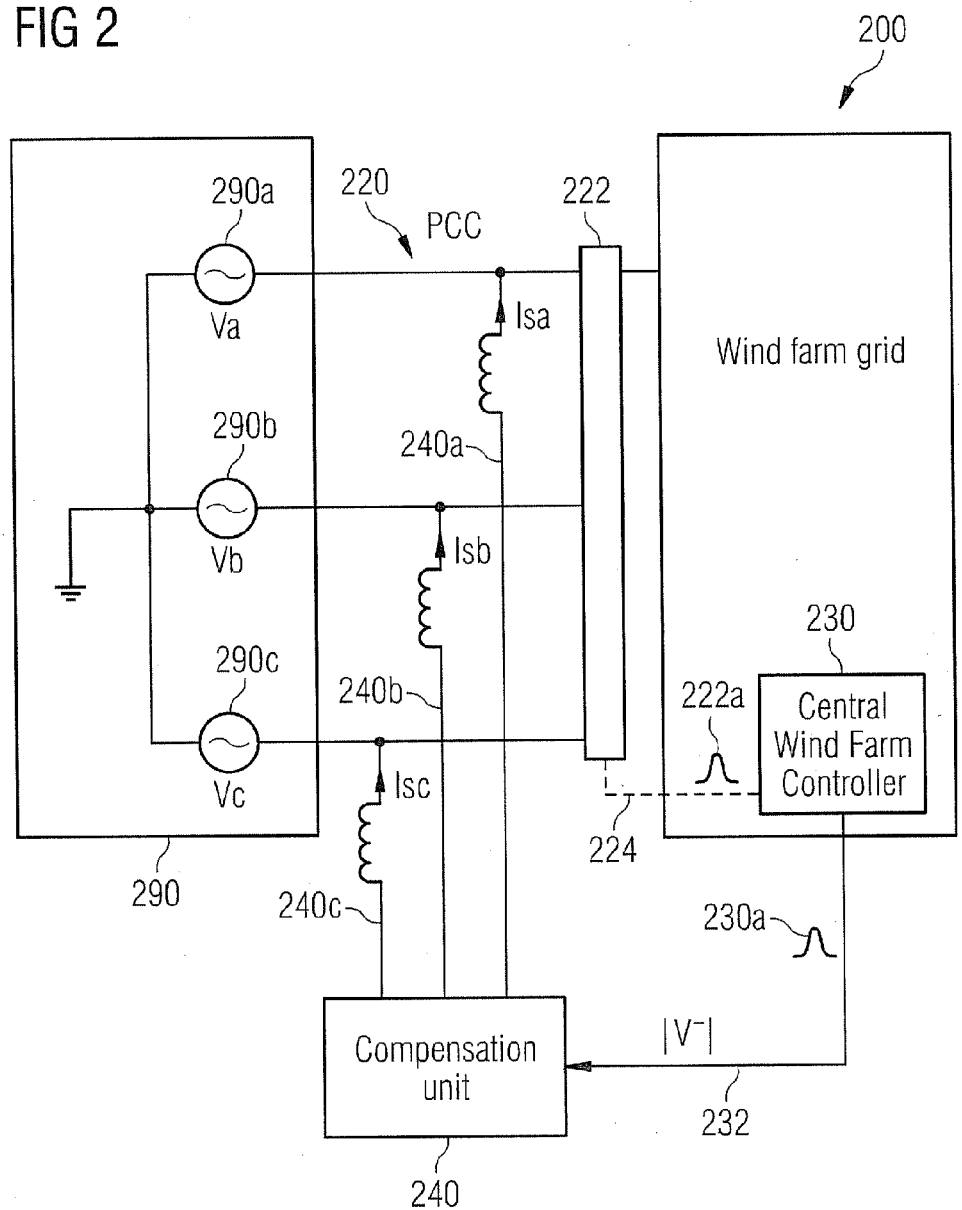
FIG. 2 shows in accordance with a second embodiment of the invention the mitigation of an electric unbalance at a PCC of a wind farm by means of a compensation unit, which in response to a control signal provided by a central wind farm controller, which control signal depends on the VUF at the PCC, is configured for injecting adjustment currents to the various phases of the three-phase current at the PCC.

FIG. 2 shows a second embodiment of the invention. A wind farm 200 is connected to a power grid connection point 290 via a PCC 220. The power grid connection point 290 is schematically illustrated by its Thevenin equivalent voltage sources 290a, 290b and 290c each being assigned to one phase of a three-phase current. Again, the wind farm 200 comprises a plurality of non depicted wind turbines, which are controlled in a supervising manner by a central wind farm controller 230.

The central wind farm controller 230 receives from a measurement unit 222 a measurement signal 222a, which is indicative for the measured electric unbalance at the PCC 220 and which is transmitted via a data connection 224 to the central wind farm controller 230. Again, the measurement signal is the Voltage Unbalance Factor (VUF), which is given by the ratio between the amplitude of a negative sequence and the amplitude of a positive sequence of the voltage signal of the three-phase current at the PCC 220.

Based on the VUF 222a the central wind farm controller 230 determines a control signal 230a, which is forwarded via a data connection line 232 to an electric unbalancing compensation unit 240. According to the embodiment described here the control signal 230a is proportional to the amplitude of the negative sequence of the (unbalanced) voltage signal at the PCC 220. In FIG. 2 this amplitude is denominated with |V−|.

Based on the amplitude |V−| of the negative sequence the electric unbalancing compensation unit 240 generates adjustment currents Isa, Isb and Isc, which are injected to the PCC 220 via three current injecting lines 240a, 240b and 240c, respectively. Each one of the adjustment currents Isa, Isb and Isc has a current value, which causes the electric unbalance at the PCC 220 to be mitigated.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

The invention claimed is:

1. A system for mitigating an electric unbalance of a three-phase current at a Point of Common Coupling being located between a wind farm, the wind farm comprising a plurality of wind turbines and a power grid, the system comprising:
    a measurement device for measuring the electric unbalance at the Point of Common Coupling and for providing a measurement signal being indicative for the measured electric unbalance, and
    a central wind farm controller for controlling the operation of the plurality of wind turbines,
    wherein the central wind farm controller is coupled to the measurement device,
    wherein in response to the measurement signal the central wind farm controller is configured for providing a control signal for mitigating the electric unbalance at the Point of Common Coupling, and
    wherein the measurement signal is a Voltage Unbalance Factor which is given by the ratio between the amplitude of a negative sequence and the amplitude of a positive sequence of the voltage signal of the three-phase current at the Point of Common Coupling.

2. The system according to claim 1, wherein
    the central wind farm controller is configured for determining a difference value between the measured Voltage Unbalance Factor and a predefined reference Voltage Unbalance Factor, and
    the central wind farm controller comprises a control unit, which is configured for processing the determined difference value and for outputting a negative sequence voltage compensation signal which is used for mitigating the electric unbalance at the Point of Common Coupling.

3. The system according to claim 2, wherein the control unit comprises
    a proportional control circuit,
    a proportional derivative control circuit,
    a proportional integral derivative control circuit, and/or
    a Lead/Lag control circuit.

4. The system according to claim 1, wherein the control signal being provided by the central wind farm controller is a compensation signal for power converters of at least some of the plurality of wind turbines.

5. The system according to claim 1, further comprising an electric unbalancing compensation unit, which is coupled to the central wind farm controller and which, in response to the control signal provided by the central wind farm controller, is configured for injecting adjustment currents to the various phases of the three-phase current at the Point of Common Connection.

6. The system according to claim 1, further comprising a transformer, which is connected between the Point of Common Coupling and a power transmission link connecting the transformer with a substation of a power grid.

7. The system according to claim 6, wherein the measurement device is connected between the Point of Common Coupling and the transformer.

8. The system according to claim 6, wherein the measurement device is connected between the transformer and the power transmission link.

9. A method for mitigating an electric unbalance of a three-phase current at a Point of Common Coupling being located between a wind farm, the wind farm comprising a plurality of wind turbines and a power grid, the method comprising
    measuring the electric unbalance at the Point of Common Coupling via a measurement device,
    forwarding a measurement signal being indicative for the measured electric unbalance from the measurement device to a central wind farm controller, which is adapted for controlling the operation of the plurality of wind turbines, and
    providing by the central wind farm controller in response to the measurement signal a control signal for mitigating the electric unbalance at the Point of Common Coupling,
    wherein the measurement signal is a Voltage Unbalance Factor which is given by the ratio between the amplitude of a negative sequence and the amplitude of a positive sequence of the voltage signal of the three-phase current at the Point of Common Coupling.

10. A non-transitory computer readable storage medium, the storage medium comprising a computer program for mitigating an electric unbalance of a three-phase current at a Point of Common Coupling being located between a wind farm, the wind farm comprising a plurality of wind turbines and a power grid, the computer program, when being executed by a data processor, is adapted for carrying out the method according to claim 9.

\* \* \* \* \*